(12) United States Patent
Wang et al.

(10) Patent No.: US 10,911,084 B2
(45) Date of Patent: Feb. 2, 2021

(54) MULTICHANNEL PASSIVE INTERMODULATION DIGITAL CANCELLATION CIRCUIT

(71) Applicant: HUAWEI TECHNOLOGIES CO., LTD., Guangdong (CN)

(72) Inventors: Hao Wang, Dongguan (CN); Yingying Chen, Shenzhen (CN); Yuping Luo, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/857,815

(22) Filed: Apr. 24, 2020

(65) Prior Publication Data

US 2020/0252094 A1    Aug. 6, 2020

Related U.S. Application Data

(63) Continuation of application No. PCT/CN2017/108128, filed on Oct. 27, 2017.

(51) Int. Cl.
  *H04B 1/12*    (2006.01)
  *H04L 27/01*    (2006.01)

(52) U.S. Cl.
  CPC .......... *H04B 1/123* (2013.01); *H04L 27/01* (2013.01)

(58) Field of Classification Search
  CPC ................. H04B 1/10; H04B 1/0475; H04B 2001/1045; H04L 124/0381
  See application file for complete search history.

(56) References Cited

U.S. PATENT DOCUMENTS

2018/0062696 A1*    3/2018    Kawasaki ............ H04L 5/1461
2018/0248572 A1*    8/2018    Ishikawa ............. H04B 1/0475

FOREIGN PATENT DOCUMENTS

CN    104168234 A    11/2014
CN    104283580 A    1/2015
(Continued)

*Primary Examiner* — Kevin Kim
(74) *Attorney, Agent, or Firm* — Womble Bond Dickinson (US) LLP

(57) ABSTRACT

The present disclosure discloses a multichannel PIM digital cancellation circuit, including a first frequency-shift variable rate module, a second frequency-shift variable rate module, a first conversion circuit, a second conversion circuit, a duplexer, a second transmission duplexer, a channel combiner, a third conversion circuit, a cascaded filter circuit, a PIM canceller, a feedback circuit, and a first adder. The cascaded filter circuit compensates for channel responses such as a delay difference or a phase difference generated after a transmit signal passes through a digital domain downlink, a digital-to-analog converter, and an analog domain downlink; the cascaded filter circuit simulates a group delay unevenness characteristic of the duplexer in the multichannel PIM digital cancellation circuit; a cascaded filter fits an S parameter of the channel combiner in the multichannel PIM digital cancellation circuit, and precisely fits a combining process of the channel combiner in a digital domain, so that a signal capable of canceling a PIM interference signal of a multi-transmission and multi-reception inter-mediate radio frequency system that includes the channel combiner is finally generated in the present disclosure.

15 Claims, 7 Drawing Sheets

(56) References Cited

FOREIGN PATENT DOCUMENTS

| | | |
|---|---|---|
| CN | 106849970 | 6/2017 |
| CN | 107271769 A | 10/2017 |
| EP | 3065317 A1 | 9/2016 |
| WO | 2009082084 A1 | 7/2009 |
| WO | 2012161632 A1 | 11/2012 |
| WO | 2015085547 A1 | 6/2015 |
| WO | 2016148538 A1 | 9/2016 |
| WO | 2017147759 A1 | 9/2017 |

* cited by examiner

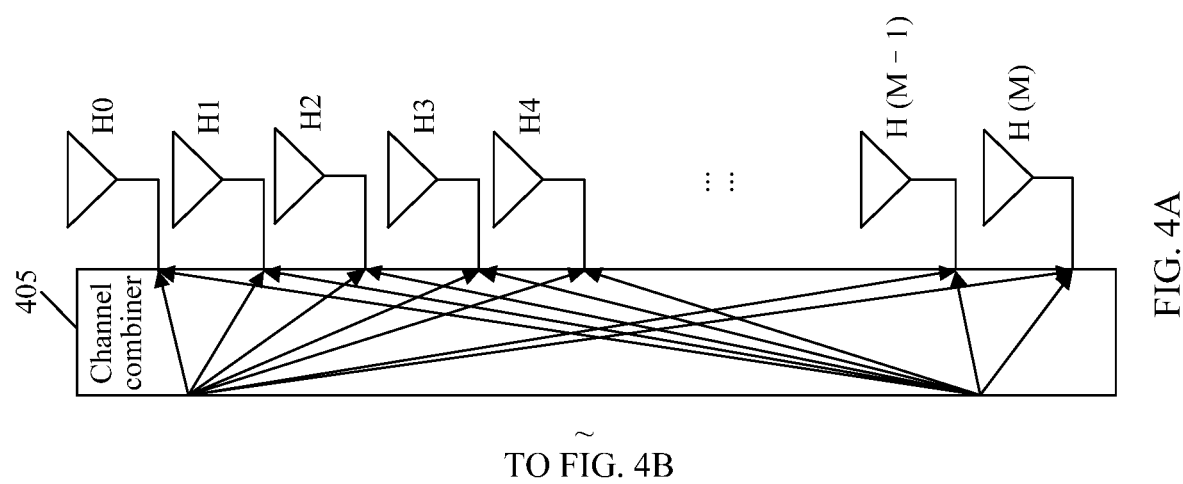

MULTICHANNEL PASSIVE INTERMODULATION DIGITAL CANCELLATION CIRCUIT

CROSS-REFERENCE TO RELATED APPLICATIONS

This application is a continuation of International Application No. PCT/CN2017/108128, filed on Oct. 27, 2017, the disclosure of which is hereby incorporated by reference in its entirety.

TECHNICAL FIELD

This disclosure relates to the field of passive intermodulation cancellation, and in particular, to a multichannel passive intermodulation digital cancellation circuit.

BACKGROUND

In a multi-carrier base station communications system of a frequency division duplexing (FDD) standard, in a multi-carrier scenario that occupies a large transmission bandwidth, an antenna system generates a passive intermodulation (PIM) interference signal because of damaged components, loose screws, shock and another reason. When falling within a receiving frequency band, a frequency of the PIM interference signal overlaps or extends a spectrum of a received signal, seriously affecting receiving sensitivity of the base station system. Consequently, an uplink throughput rate of the network is affected.

Based on the foregoing problem, a PIM canceller is provided in the prior art. The PIM canceller can perform, in a digital domain, non-linear modeling and cancellation on a PIM interference signal that falls within a receiving frequency band. However, a PIM interference signal of a multi-transmission and multi-reception inter-mediate radio frequency system that includes a channel combiner in a form such as a bridge or a V network structure cannot be cancelled.

SUMMARY

Embodiments of the present disclosure disclose a multi-channel passive intermodulation digital cancellation circuit, to resolve a problem that a PIM interference signal of a multi-transmission and multi-reception inter-mediate radio frequency system that includes a combiner in a form such as a bridge or a V network structure cannot be cancelled.

One embodiment of the present disclosure provides a multichannel PIM digital cancellation circuit, including:

a first frequency-shift variable rate module, a second frequency-shift variable rate module, a first conversion circuit, a second conversion circuit, a duplexer, a second transmission duplexer, a channel combiner, a third conversion circuit, a cascaded filter circuit, a PIM canceller, a feedback circuit, and a first adder, where an input port of the first frequency-shift variable rate module is used as a first input port of the multichannel PIM digital cancellation circuit, an output port of the first frequency-shift variable rate module is connected to an input port of the first conversion circuit, an output port of the first conversion circuit is connected to a first input port of the duplexer, and a first output port of the duplexer is connected to a first input/output port of the channel combiner;

an input port of the second frequency-shift variable rate module is used as a second input port of the multichannel PIM digital cancellation circuit, an output port of the second frequency-shift variable rate module is connected to an input port of the second conversion circuit, an output port of the second conversion circuit is connected to an input port of the second transmission duplexer, and an output port of the second transmission duplexer is connected to a second input/output port of the channel combiner;

a first input port of the cascaded filter module is connected to the output port of the first frequency-shift variable rate module, a second input port of the cascaded filter module is connected to the output port of the second frequency-shift variable rate module, a first output port and the second output port of the cascaded filter module are connected to an input port of the PIM canceller, and an output port of the PIM canceller is connected to a first input port of the first adder; and the first input/output port of the channel combiner is connected to a second input port of the duplexer, a second output port of the duplexer is connected to an input port of the third conversion circuit, an output port of the third conversion circuit is connected to a second input port of the first adder, and an output port of the first adder is an output port of the multichannel PIM digital cancellation circuit.

In one embodiment, the cascaded filter circuit includes:

a first channel filter, a second channel filter, a first equalization filter, a second equalization filter, a first linear filter, a second linear filter, a third linear filter, a fourth linear filter, a second adder, and a third adder, where an input port of the first channel filter and an input port of the second channel filter are respectively a first input port and a second input port of the cascaded filter circuit, an output port of the first channel filter is connected to an input port of the first equalization filter, and an output port of the second channel filter is connected to an input port of the second equalization filter;

an output port of the first equalization filter is connected to an input port of the first linear filter and an input port of the second linear filter, and an output port of the second equalization filter is connected to an input port of the third linear filter and an input port of the fourth linear filter;

an output port of the first linear filter and an output port of the third linear filter are respectively connected to a first input port and a second input port of the second adder, and an output port of the second linear filter and an output port of the fourth linear filter are respectively connected to a first input port and a second input port the third adder; and an output port of the second adder and an output port of the third adder are respectively a first output port and a second output port of the cascaded filter circuit.

In one embodiment, the first conversion circuit includes:

a first digital domain downlink, a first digital-to-analog converter, and a first analog domain downlink, where an input port of the first digital domain downlink is the input port of the first conversion circuit, an output port of the first digital domain downlink is connected to an input port of the first digital-to-analog converter, an output port of the first digital-to-analog converter is connected to an input port of the first analog domain downlink, and an output port of the first analog domain downlink is the output port of the first conversion circuit.

In one embodiment, the second conversion circuit includes:

a second digital domain downlink, a second digital-to-analog converter, and a second analog domain downlink, where an input port of the second digital domain downlink is the input port of the second conversion circuit, an output port of the second digital domain downlink is connected to an input port of the second digital-to-analog converter, an output port of the second digital-to-analog converter is connected to an input port of the second analog domain downlink, and an output port of the second analog domain downlink is the output port of the second conversion circuit.

In one embodiment, the duplexer includes:

a first transmission duplexer and a receiving duplexer, where an input port of the first transmission duplexer is the first input port of the duplexer, an output port of the first transmission duplexer is the first output port of the duplexer; and an input port of the receiving duplexer is the second input port of the duplexer, and an output port of the receiving duplexer is the second output port of the duplexer.

In one embodiment, the third conversion circuit includes:

a first analog-to-digital conversion circuit and an analog domain uplink, where an input port of the analog domain uplink is the input port of the third conversion circuit, an output port of the analog domain uplink is connected to an input port of a first analog-to-digital converter, and an output port of the first analog-to-digital converter is the output port of the third conversion circuit.

In one embodiment, the feedback circuit includes:

a combiner, a second analog-to-digital converter, a digital domain feedback link, and a third memory, where an input port of the combiner is an input port of the feedback circuit, an output port of the combiner is connected to an input port of the second analog-to-digital converter; and an output port of the second analog-to-digital converter is connected to an input port of the digital domain feedback link, and an output port of the digital domain feedback link is connected to an input port of the third memory.

In one embodiment, the multichannel PIM digital cancellation circuit further includes a first data collection node U0, a second data collection node U1, and a third data collection node S0; and the first data collection node U0 is located at the output port of the first frequency-shift variable rate module, the second data collection node U1 is located at the output port of the second frequency-shift variable rate module, and the third data collection node S0 is located at the output port of the second digital domain downlink.

In one embodiment, the multichannel PIM digital cancellation circuit further includes a first coupling node P0 and a second coupling node P1; and the first coupling node P0 is connected to the output port of the first transmission duplexer, and the second coupling node P1 is connected to the output port of the second transmission duplexer.

In one embodiment, the multichannel PIM digital cancellation circuit further includes a first memory and a second memory; and an input port of the first memory is connected to the output port of the first frequency-shift variable rate module, and an input port of the second memory is connected to the output port of the second frequency-shift variable rate module.

In one embodiment, the multichannel PIM digital cancellation circuit further includes a processor, the processor includes a first processor, a second processor, and a third processor;

an output port of the first processor, an output port of second memory, and an output port of the third memory are all connected to an input port of the first processor, and the output port of the first processor is connected to an input port of a coefficient register of the first channel filter and an input port of a coefficient register of the second channel filter;

an output port of the second processor is connected to an input port of a coefficient register of the first equalization filter and an input port of a coefficient register of the second equalization filter; and an output port of the third processor is connected to an input port of a coefficient register of the first linear filter, an input port of a coefficient register of the second linear filter, an input port of a coefficient register of the third linear filter, and an input port of a coefficient register of the fourth linear filter.

In one embodiment, the first processor is configured to store data collected from the first data collection node U0 to the first memory;

the first processor is further configured to store data collected from the second data collection node U1 to the second memory; and the first processor is further configured to store data collected from the third data collection node S0 to the third memory.

In one embodiment, the first processor is further configured to:

obtain the data collected from the first data collection node U0 from the first memory, obtain the data collected from the second data collection node U1 from the second memory, and obtain the data collected from the third data collection node S0 from the third memory;

fit the data collected from the first data collection node U0, the data collected from the second data collection node U1, and the data collected from the third data collection node S0 by using linear interpolation, to obtain a filtering coefficient of the first channel filter and a filtering coefficient of the second channel filter; and download the filtering coefficient of the first channel filter and the filtering coefficient of the second channel filter respectively to the coefficient register of the first channel filter and the coefficient register of the second channel filter.

In one embodiment, the second processor is further configured to:

obtain an S parameter of the duplexer;

fit the S parameter of the duplexer by using linear interpolation, to obtain a filtering coefficient of the first equalization filter and a filtering coefficient of the second equalization filter; and download the filtering coefficient of the first equalization filter and the filtering coefficient of the second equalization filter respectively to the coefficient register of the first equalization filter and the coefficient register of the second equalization filter.

In one embodiment, the third processor is further configured to:

obtain an S parameter of the channel combiner;

fit the S parameter of the channel combiner by using linear interpolation, to obtain a filtering coefficient of the first linear filter, a filtering coefficient of the second linear filter, a filtering coefficient of the third linear filter, and a filtering coefficient of the fourth linear filter; and download the filtering coefficient of the first linear filter, the filtering coefficient of the second linear filter, the filtering coefficient of the third linear filter, and the filtering coefficient of the fourth linear filter respectively to the coefficient register of the first linear filter, the coefficient register of the second linear filter, the coefficient register of the third linear filter, and the coefficient register of the fourth linear filter.

In some embodiments of the present disclosure, the channel filter in the cascaded filter circuit compensates for inconsistency of channel responses such as a delay difference or a phase difference generated after a transmit signal passes through the digital domain downlink, the digital-to-analog converter, and the analog domain downlink; the equalization filter in the cascaded filter circuit is configured to simulate a group delay unevenness characteristic of the duplexer in the multichannel PIM digital cancellation circuit; the linear filter of a cascaded filter fits an S parameter of the channel combiner in the multichannel PIM digital cancellation circuit, and precisely fits a combining process of the channel combiner in a digital domain, so that a signal capable of canceling a PIM interference signal of a multi-transmission and multi-reception inter-mediate radio frequency system that includes the channel combiner is finally generated in the multichannel PIM digital cancellation circuit.

BRIEF DESCRIPTION OF DRAWINGS

To describe the technical solutions in the embodiments of the present disclosure or in the prior art more clearly, the accompanying drawings are briefly described below. Apparently, the accompanying drawings in the following description show merely some embodiments of the present disclosure, and a person of ordinary skill in the art may derive other drawings from these accompanying drawings without creative efforts.

FIG. 4A and FIG. 4B are a schematic structural diagram of another multichannel PIM digital cancellation circuit according to an embodiment of the present disclosure.

DESCRIPTION OF EMBODIMENTS

The following clearly and completely describes the technical solutions in the embodiments of the present disclosure with reference to the accompanying drawings in the embodiments of the present disclosure.

Figure 1:
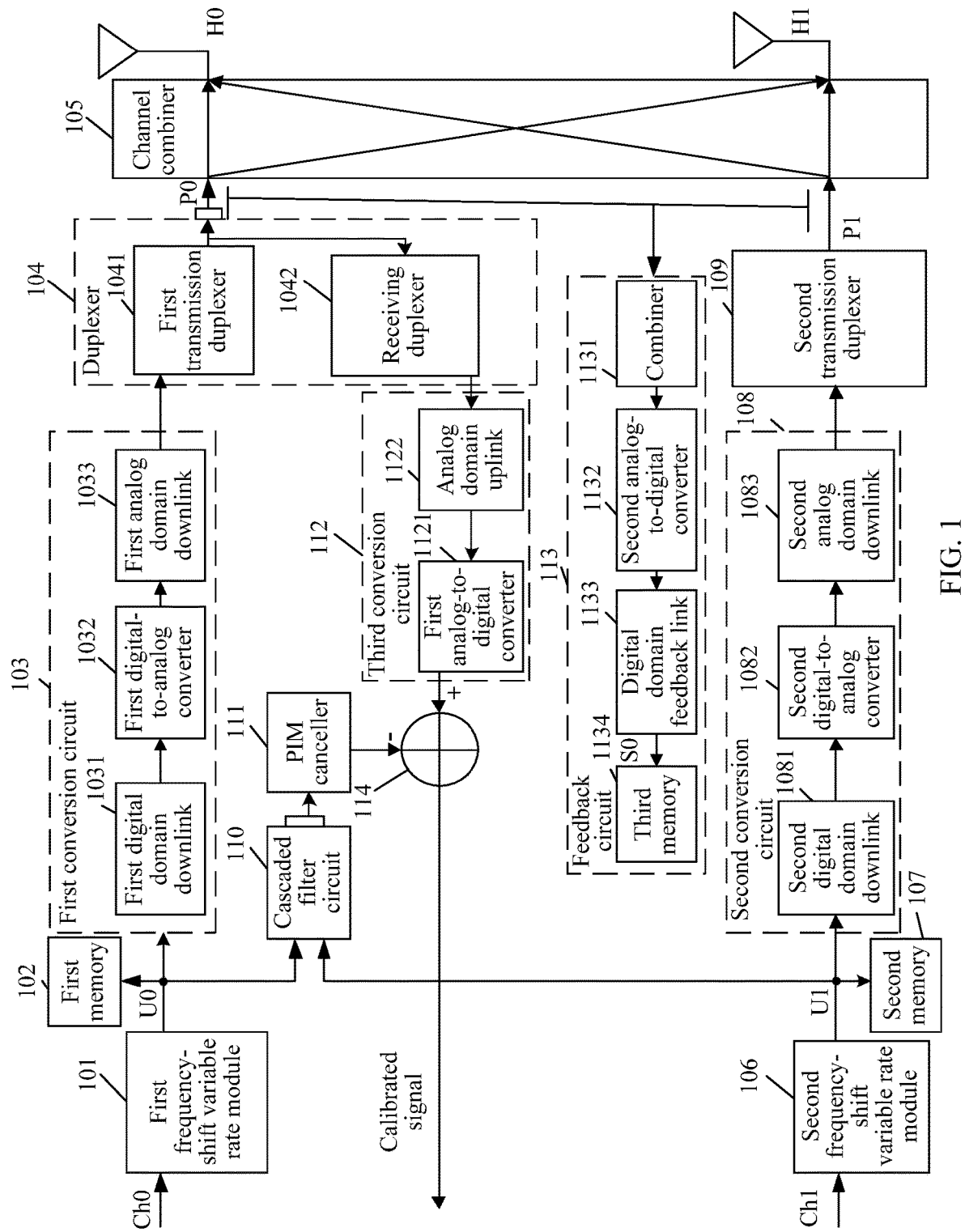
FIG. 1 is a schematic structural diagram of a multichannel PIM digital cancellation circuit according to an embodiment of the present disclosure.

FIG. 1 is a schematic structural diagram of a multichannel PIM digital cancellation circuit according to an embodiment of the present disclosure. As shown in FIG. 1, the multichannel PIM digital cancellation circuit includes the following:

a first frequency-shift variable rate module 101, a first memory 102, a first conversion circuit 103, a duplexer 104, a channel combiner 105, a second frequency-shift variable rate module 106, a second memory 107, a second conversion circuit 108, a second transmission duplexer 109, a cascaded filter circuit 110, a PIM canceller 111, a third conversion circuit 112, a feedback circuit 113, and a first adder 114.

An input port of the first frequency-shift variable rate module 101 is a first input port of the multichannel PIM digital cancellation circuit, an output port of the first frequency-shift variable rate module 101 is connected to an input port of the first conversion circuit 103, an output port of the first conversion circuit 103 is connected to a first input port of the duplexer 104, and a first output port of the duplexer 104 is connected to a first input/output port of the channel combiner 105.

Specifically, the first conversion circuit 103 includes a first digital domain downlink 1031, a first digital-to-analog converter 1032, and a first analog domain downlink 1033. An input port of the first digital domain downlink 1031 is the input port of the first conversion circuit 103, an output port of the first digital domain downlink 1031 is connected to an input port of the first digital-to-analog converter 1032, an output port of the first digital-to-analog converter 1032 is connected to an input port of the first analog domain downlink 1033, and an output port of the first analog domain downlink 1033 is the output port of the first conversion circuit.

Specifically, the duplexer 104 includes a first transmission duplexer 1041 and a receiving duplexer 1042. An input port of the first transmission duplexer 1041 is the first input port of the duplexer 104, an output port of the first transmission duplexer 1041 is the first output port of the duplexer 104; and an input port and an output port of the receiving duplexer 1042 are respectively a second input port and a second output port of the duplexer 104.

It should be noted that, the output port of the first transmission duplexer 1041 and the input port of the receiving duplexer 1042 are connected to a joint header of the duplexer 104. From the outside perspective, the duplexer 104 has an input/output port. The input/output port is connected to the first input/output port of the channel combiner 105.

That the output port of the first conversion circuit is connected to the first input port of the duplexer 104 is specifically that the output port of the first conversion circuit is connected to the input port of the first transmission duplexer 1041 in the duplexer 104. That the first output port of the duplexer 104 is connected to the first input/output port of the channel combiner 105 is specifically that the output port of the first transmission duplexer 1041 in the duplexer 104 is connected to the first input/output port of the channel combiner 105.

An input port of the second frequency-shift variable rate module 106 is a second input port of the multichannel PIM digital cancellation circuit, an output port of the second frequency-shift variable rate module 106 is connected to an input port of the second conversion circuit 108, an output port of the second conversion circuit 108 is connected to an input port of the second transmission duplexer 109, and an output port of the second transmission duplexer 109 is connected to a second input/output port of the channel combiner 105.

Specifically, the second conversion circuit 108 includes a second digital domain downlink 1081, a second digital-to-analog converter 1082, and a second analog domain downlink 1083. An input port of the second digital domain downlink 1081 is the input port of the second conversion circuit 108, an output port of the second digital domain downlink 1081 is connected to an input port of the second digital-to-analog converter 1082, an output port of the second digital-to-analog converter 1082 is connected to an input port of the second analog domain downlink 1083, and an output port of the second analog domain downlink 1083 is the output port of the second conversion circuit 108.

The multichannel PIM digital cancellation circuit further includes a first data collection node U0 and a second data collection node U1. The first data collection node U0 is connected to the output port of the first frequency-shift variable rate module 101, and the second data collection node U1 is connected to the output port of the second frequency-shift variable rate module 106. A first input port of the cascaded filter circuit 110 is connected to the first data collection node U0, and a second input port of the cascaded filter circuit 110 is connected to the second data collection node U1. In other words, the first input port of the cascaded filter circuit 110 is connected to the output port of the first frequency-shift variable rate module 101, and the second input port of the cascaded filter circuit 110 is connected to the output port of the second frequency-shift variable rate module 106. A first output port and a second output port of the cascaded filter circuit 110 are connected to an input port of the PIM canceller 111, and an output port of the PIM canceller 111 is connected to a first input port of the first adder 114.

Further, an input port of the first memory 102 is connected to the first data collection node U0, and an input port of the second memory 107 is connected to the first data collection node U1. In other words, the input port of the first memory 102 is connected to the output port of the first frequency-shift variable rate module 101, and the input port of the second memory 107 is connected to the output port of the second frequency-shift variable rate module 106.

The first input/output port of the channel combiner 105 is connected to the second input port of the duplexer 104 (that is, the input port of the receiving duplexer 1042), the second output port of the duplexer 104 (that is, the output port of the receiving duplexer 1042) is connected to an input port of the third conversion circuit 112, an output port of the third conversion circuit 112 is connected to a second input port of the first adder 114, and an output port of the first adder 114 is an output port of the multichannel PIM digital cancellation circuit.

Specifically, the third conversion circuit 112 includes a first analog-to-digital converter 1121 and an analog domain uplink 1122. An input port of the analog domain uplink is the input port of the third conversion circuit, an output port of the analog domain uplink is connected to an input port of the first analog-to-digital converter, and an output port of the first analog-to-digital converter is the output port of the third conversion circuit.

The multichannel PIM digital cancellation circuit further includes a first coupling node P0 and a second coupling node P1. The first coupling node P0 is located between the first output port of the duplexer 104 (that is, the output port of the first transmission duplexer 1041) and the first input/output port of the channel combiner 105, and the second coupling node P1 is located between the second transmission duplexer 109 and the second input/output port of the channel combiner 105. The first coupling node P0 and the second coupling node P1 are connected to an input port of the feedback circuit 113.

Specifically, the feedback circuit 113 includes a combiner 1131, a second analog-to-digital converter 1132, a digital domain feedback link 1133, and a third memory 1134. An input port of the combiner 1131 is the input port of the feedback circuit 114, an output port of the combiner 1131 is connected to an input port of the second analog-to-digital converter 1132, the second analog-to-digital converter 1132 is connected to an input port of the digital domain feedback link 1133, and an output port of the digital domain feedback link 1133 is connected to an input port of the third memory 1134.

Specifically, a working process of the multichannel PIM digital cancellation circuit is as follows.

Transmit direction: A first transmit signal Ch0 is input into the multichannel PIM digital cancellation circuit through the input port of the first frequency-shift variable rate module 101. The first frequency-shift variable rate module 101 separately performs frequency shift, variable rate, and clipping processing on the first transmit signal Ch0 in sequence, and transmits a first sending signal obtained after the processing to the first digital domain downlink 1031 of the first conversion circuit 103. The first digital domain downlink 1031 performs processing such as digital predistortion and quadrature modulation compensation (QMC) on the first sending signal, and transmits a second sending signal obtained after the processing to the first digital-to-analog converter 1032. The first digital-to-analog converter 1032 converts the second sending signal from a digital domain to an analog domain. In other words, the first digital-to-analog converter 1032 converts the second sending signal from a digital signal into an analog signal, to obtain a third sending signal, and transmits the third sending signal to the first analog domain downlink 1033. The first analog domain downlink 1033 performs processing such as power amplification on the third sending signal, to obtain a fourth sending signal, and transmits the fourth sending signal to the first transmission duplexer 104, and the first transmission duplexer 1041 transmits the fourth sending signal to the channel combiner 105.

Similarly, a second transmit signal Ch1 is input into the multichannel PIM digital cancellation circuit through the input port of the second frequency-shift variable rate module 106. The second frequency-shift variable rate module 106 separately performs frequency shift, variable rate, and clipping processing on the second transmit signal Ch1 in sequence, and transmits a fifth sending signal obtained after the processing to the second digital domain downlink 1081 of the second conversion circuit 108. The second digital domain downlink 1081 performs processing such as digital predistortion and quadrature modulation compensation (QMC) on the sixth sending signal, and transmits a sixth sending signal obtained after the processing to the second digital-to-analog converter 1082. The first digital-to-analog converter 1082 converts the sixth sending signal from a digital domain to an analog domain. In other words, the second digital-to-analog converter 1082 converts the sixth sending signal from a digital signal into an analog signal, to obtain a seventh sending signal, and transmits the seventh sending signal to the second analog domain downlink 1083. The second analog domain downlink 1083 performs processing such as power amplification on the seventh sending signal, to obtain an eighth sending signal, and transmits the eighth sending signal to the second transmission duplexer 109, and the first transmission duplexer 109 transmits the eighth sending signal to the channel coupler 105.

It should be noted that, the QMC processing is specifically compensation for a phase offset, an amplitude offset, and local oscillator leakage in an analog quadrature modulation (AQM) process. The function is specifically implemented by a QMC module.

The channel combiner 105 combines the fourth sending signal with the eighth sending signal, and sends into an antenna port for transmission.

Signals collected at the first coupling node P0 and the second coupling node P1 are respectively the fourth sending signal and the eighth sending signal. After the fourth sending signal and the eighth sending signal are transmitted to the input port of the feedback circuit 113 (that is, the input port of the combiner 1131), the combiner 1131 superposes the fourth sending signal and the eighth sending signal, to obtain a first processing signal, that is, the first processing signal=the fourth sending signal+the eighth sending signal. The second analog-to-digital converter 1132 converts the first processing signal from an analog domain to a digital domain, that is, converts the first processing signal from an analog signal into a digital signal, to obtain a second processing signal, and the second digital domain downlink performs frequency shift and variable rate processing on the second processing signal, to obtain a third processing signal, and stores the third processing signal to the third memory 1134.

After the first sending signal and the fifth sending signal are respectively input into the first input port and the second input port of the cascaded filter circuit 110, the cascaded filter circuit 110 respectively outputs a first filtering signal and a second filtering signal from the first output port and the second port of the cascaded filter circuit 110 based on the first sending signal and the second sending signal. After the first filtering signal and the second filtering signal are input into the input port of the PIM canceller 111, the PIM canceller 111 generates a PIM cancellation signal based on the first filtering signal and the second filtering signal, and outputs the PIM cancellation signal from an output port of the PIM canceller 111.

The multichannel PIM digital cancellation circuit further includes a processor. After the first frequency-shift variable rate module 101 outputs the first sending signal, the processor stores the first sending signal to the first memory 102. In other words, the processor stores the data collected from the first data collection node U0 to the first memory 102. Similarly, after the second frequency-shift variable rate module 106 outputs the fifth sending signal, the processor stores the fifth sending signal to the second memory 107. In other words, the processor stores the data collected from the second data collection node U1 to the second memory 107.

It should be noted that, the first memory 102, the second memory 107, and the third memory 1134 may be a random access memory (RAM). The first memory 102, the second memory 107, and the third memory 1134 are different RAMs.

Receiving direction: After receiving a first receiving signal, an antenna of the channel combiner 105 transmits the first receiving signal to the receiving duplexer 1042, the receiving duplexer 1042 transmits the first receiving signal to the analog domain uplink 1122, and the analog domain uplink performs processing such as low noise amplification and filtering on the first receiving signal, to obtain a second receiving signal. The first analog-to-digital converter 1032 converts the second receiving signal from an analog domain to a digital domain, that is, converts the second receiving signal from an analog signal into a digital signal, to obtain a third receiving signal.

The first adder 114 subtracts the PIM cancellation signal generated by the PIM canceller 111 from the third receiving signal, to obtain a calibrated signal, that is, calibrated signal=third receiving signal−PIM cancellation signal.

It should be noted that, the third receiving signal may be considered as the first transmit signal Ch0 plus a PIM interference signal, and the PIM cancellation signal is the PIM interference signal simulated by the multichannel PIM digital cancellation circuit. The calibrated signal, that is, the first transmit signal Ch0, can be obtained by subtracting the PIM cancellation signal from the third receiving signal.

A circuit architecture and a working principle of the cascaded filter circuit are described below in detail.

Figure 2:
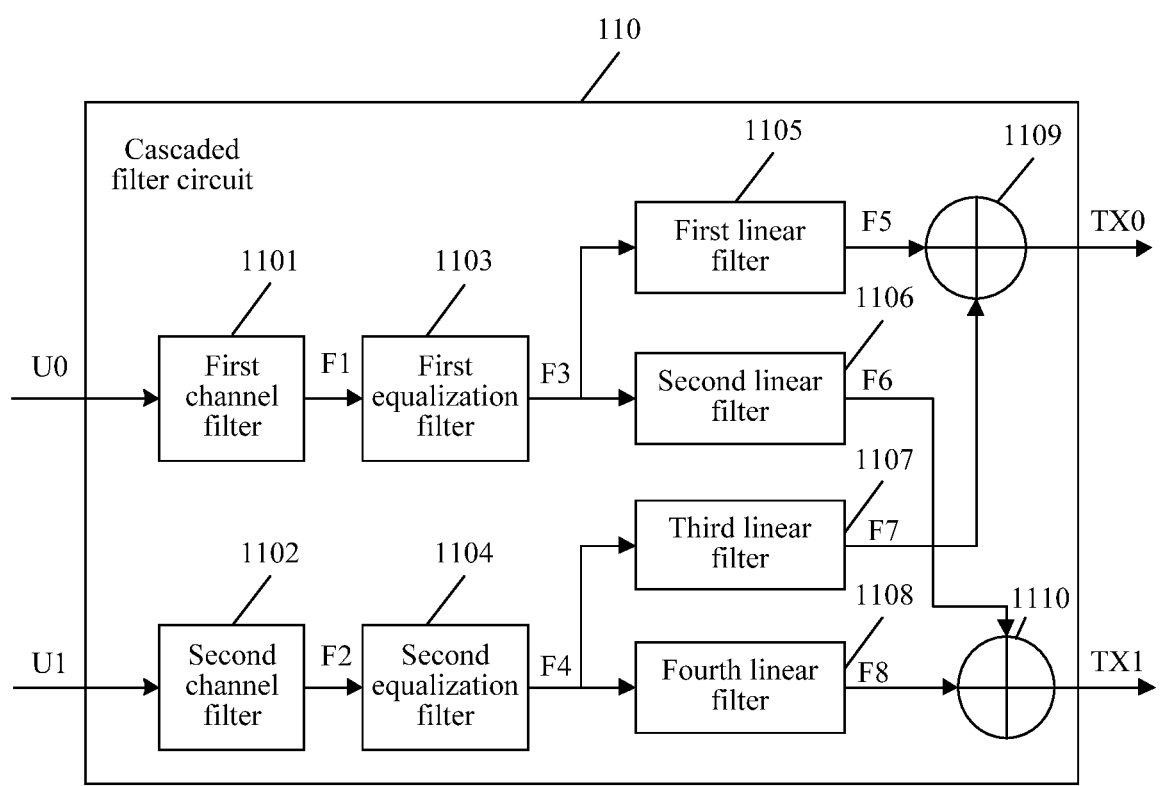
FIG. 2 is a schematic structural diagram of a cascaded filter circuit according to an embodiment of the present disclosure.

FIG. 2 is a schematic structural diagram of a cascaded filter circuit according to an embodiment of the present disclosure. As shown in FIG. 2, the circuit 110 includes: a first channel filter 1101, a second channel filter 1102, a first equalization filter 1103, a second equalization filter 1104, a first linear filter 1105, a second linear filter 1106, a third linear filter 1107, a fourth linear filter 1108, a second adder 1109, and a third adder 1110.

An input port of the first channel filter 1101 and an input port of the second channel filter 1102 are respectively a first input port and a second input port of the cascaded filter circuit 110, an input port of the first channel filter 1101 is connected to an input port of the first equalization filter 1103, and an input port of the second channel filter 1102 is connected to an input port of the second equalization filter 1104. An input port of the first linear filter 1105 and an input port of the second linear filter 1106 are connected to an output port of the first equalization filter 1103, and an input port of the third linear filter 1107 and an input port of the fourth linear filter 1108 are connected to an output port of the second equalization filter 1104. An output port of the first linear filter 1105 and an output port of the third linear filter 1107 are respectively connected to a first input port and a second input port of the second adder 1109, and an output port of the second linear filter 1106 and an output port of the fourth linear filter 1108 are respectively connected to a first input port and a second input port the third adder 1110. An output port of the second adder 1109 and an output port of the third adder 1110 are respectively a first output port and a second output port of the cascaded filter circuit 110.

After the first processing signal U0 is input into the first channel filter 1101, the first channel filter 1101 outputs a third filtering signal F1; and after the second processing signal U1 is input into the second channel filter 1102, the second channel filter 1102 outputs a fourth filtering signal F2. $F1=FIR\_CH0 \otimes U0$, $F2=FIR\_CH1 \otimes U1$, and FIR_CH0 and FIR_CH1 are respectively a filtering coefficient of the first channel filter 1101 and a filtering coefficient of the second channel filter 1102. After the third filtering signal F1 is input into the first equalization filter 1103, the first equalization filter 1103 outputs a fifth filtering signal F3; and after the fourth filtering signal F2 is input into the second equalization filter 1104, the second equalization filter 1104 outputs a sixth filtering signal F4. $F3=DUP\_EQ1 \otimes F1$, $F4=DUP\_EQ2 \otimes F2$, and DUP_EQ1 and DUP_EQ2 are respectively a filtering coefficient of the first equalization filter 1103 and a filtering coefficient of the second equalization filter 1104. After the fifth filtering signal F3 is input into the first linear filter 1105 and the second linear filter 1106, the first linear filter 1105 and the second linear filter 1106 respectively output a seventh filtering signal F5 and an eighth filtering signal F6; and after the sixth filtering signal F4 is input into the third linear filter 1107 and the fourth linear filter 1108, the third linear filter 1107 and the fourth linear filter 1108 respectively output a ninth filtering signal F7 and a tenth filtering signal F8. $F5=HB\_FIR1 \otimes F3$, $F6=HB\_FIR2 \otimes F3$, $F7=HB\_FIR3 \otimes F4$, $F8=HB\_FIR4 \otimes F4$, and HB_FIR1, HB_FIR2, HB_FIR3 and HB_FIR4 are respectively a filtering coefficient of the first linear filter 1105, a filtering coefficient of the second linear filter 1106, a filtering coefficient of the third linear filter 1107, and a filtering coefficient of the fourth linear filter 1108. After the seventh filtering signal F5 and the ninth filtering signal F7 are respectively input into the second adder 1109 through the first input port and the second input port of the second adder 1109, the second adder 1109 outputs a first filtering signal TX0; and after the eighth filtering signal F6 and the tenth filtering signal F8 are respectively input into the third adder 1110 through a first input port and a second input port of the third adder 1110, the third adder 1110 outputs a second filtering signal TX1. TX0=F5+F7, and TX1=F6+F8.

It should be noted that, $\otimes$ is a convolution operation symbol.

It should be noted that, the first channel filter 1101 and the second channel filter 1102 compensate for inconsistency of channel responses such as a delay difference or a phase difference generated when the first transmit signal Ch0 and the second transmit signal Ch1 pass through different channels, so that the first filtering signal and the second filtering signal that are input by the PIM canceller 111 are respectively in consistency with characteristics of the fourth sending signal and the eighth sending signal that are input by the channel combiner. The first equalization filter 1103 and the second equalization filter 1104 are configured to simulate a group delay unevenness characteristic of the transmission duplexer. The foregoing four linear filters are configured to simulate a combining relationship and process of the multichannel combiner 105.

A connection relationship between the processor and other parts of the multichannel PIM digital cancellation circuit and a working process of the processor are described below in detail.

Figure 3:
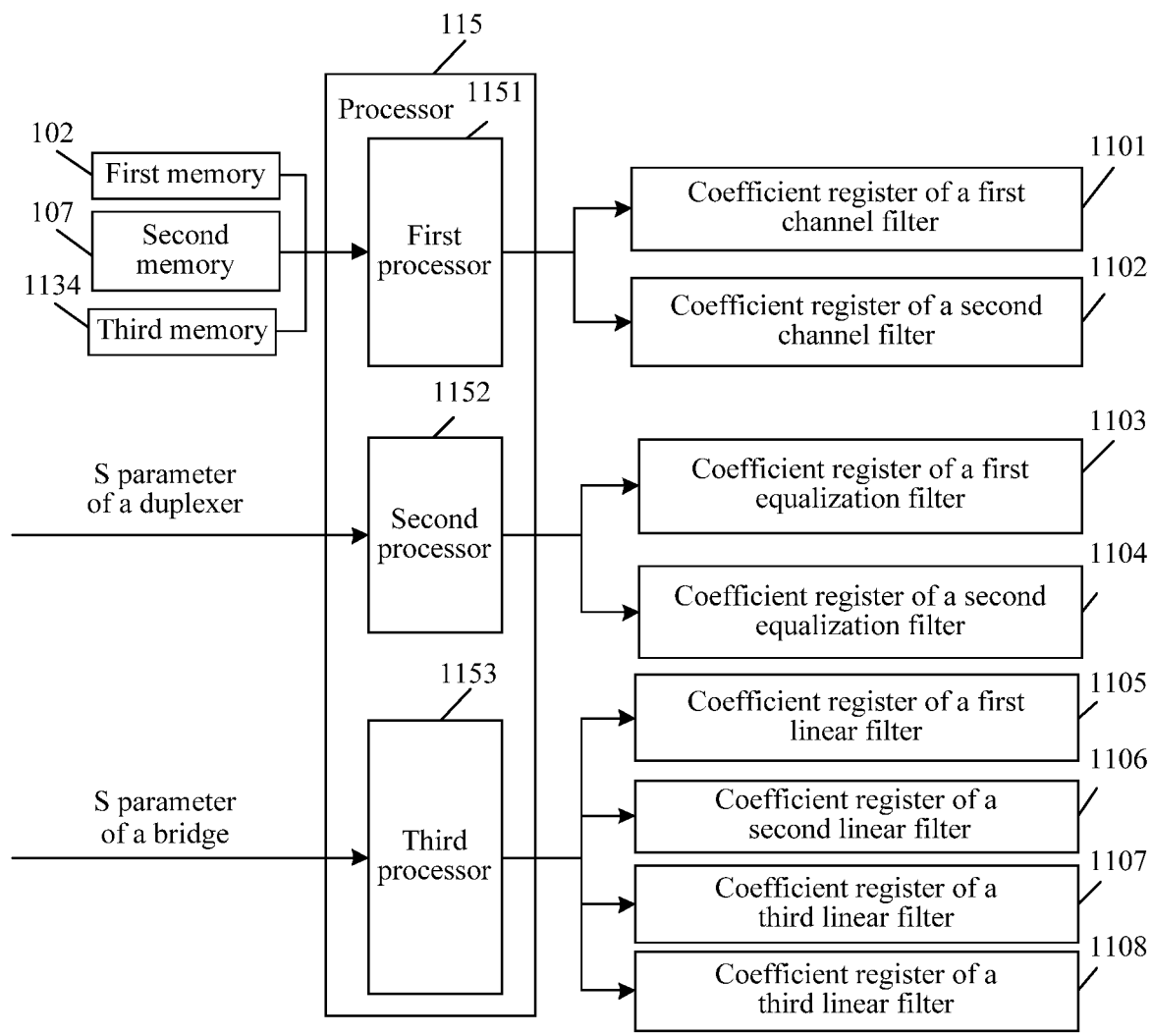
FIG. 3 is a partial schematic structural diagram of a multichannel PIM digital cancellation circuit according to an embodiment of the present disclosure.

As shown in FIG. 3, the multichannel PIM digital cancellation circuit further includes a processor 115, and the processor 115 includes a first processor 1151, a second processor 1152, and a third processor 1153.

An output port of the first memory 102, an output port of the second memory 107, and an output port of the third memory 1134 are all connected to an input port of the first processor 1151, and an input port of a coefficient register of the first channel filter 1101 and an input port of a coefficient register of the second channel filter 1102 are connected to an output port of the first processor 1151. An input port of a coefficient register of the first equalization filter 1103 and an input port of a coefficient register of the second equalization filter 1104 are connected to an output port of the second processor 1152. An input port of a coefficient register of the first linear filter 1105, an input port of a coefficient register of the second linear filter 1106, an input port of a coefficient register of the third linear filter 1107, and an input port of a coefficient register of the fourth linear filter 1108 are all connected to an output port of the third processor 1153.

The first processor 1151 obtains the first sending signal from the first memory 102, obtains the fifth sending signal from the second memory 107, and obtains the third processing signal from the third memory 1134. The first processor 1151 fits the first sending signal, the fifth sending signal, and the third processing signal by using LS linear interpolation, to obtain the filtering coefficient FIR_CH0 of the first channel filter 1101 and the filtering coefficient FIR_CH1 of the second channel filter 1102. After the first processor 1151 obtains the FIR_CH0 and the FIR_CHL the first processor 1151 downloads the FIR_CH0 and the FIR_CH1 respectively to the coefficient register of the first channel filter 1101 and the coefficient register of the second channel filter 1102.

Before the first equalization filter 1103 and the second equalization filter 1104 in the cascaded filter circuit 110 operate, the second processor 1152 performs a test on signal transmission and signal reception performed by the duplexer 104 (including the first transmission duplexer 1041 and the receiving duplexer 1042), to obtain two groups of group delay parameters or an S parameter of the duplexer 104. When the obtained data is the S parameter of the duplexer, the second processor 1152 converts the S parameter of the duplexer into the group delay parameter. The second processor 1152 fits the two groups of group delay parameters by using LS linear interpolation, to obtain the filtering coefficient DUP_EQ1 of the first equalization filter and the filtering coefficient DUP_EQ2 of the second equalization filter. After the second processor 1152 obtains the DUP_EQ1 and the DUP_EQ2, the second processor 1152 downloads the DUP_EQ1 and the DUP_EQ2 respectively to the coefficient register of the first equalization filter 1103 and the coefficient register of the second equalization filter 1104.

Before the operation of the channel combiner 105, the third processor 1153 tests the channel combiner, to obtain the S parameter of the channel combiner. Then the third processor 1153 obtains frequency response information (herein refer to FIG. 1) of the signal from P0 to H0, from P0 to H1, from P1 to H0, and from P1 to H1 based on the S parameter. The third processor 1153 fits the foregoing four paths of responses by linear interpolation respectively by using four linear filters (including the first linear filter 1105, the second linear filter 1106, the third linear filter 1107, and the fourth linear filter 1108), to obtain the filtering coefficients of the four linear filters: HB_FIR1, HB_FIR2, HB_FIR3, and HB_FIR4. The third processor downloads the four filtering coefficients, namely, HB_FIR1, HB_FIR2, HB_FIR3, and HB_FIR4 respectively to the coefficient register of the first linear filter 1105, the coefficient register of the second linear filter 1106, the coefficient register of the third linear filter 1107, and the coefficient register of the fourth linear filter 1108.

It should be noted that, the first processor 1151, the second processor 1152, and the third processor 1153 may all be DSP chips, and the first processor 1151, the second processor 1152, and the third processor 1153 may be a same DSP chip, or may be different DSP chips.

It should be noted that, the channel combiner in the multichannel PIM digital cancellation circuit shown in FIG. 1 to FIG. 3 is a bridge.

It can be learned that, in the solutions of the embodiments of the present disclosure, the channel filter in the cascaded filter circuit compensates for inconsistency of channel responses such as a delay difference or a phase difference generated after a transmit signal passes through the digital domain downlink, the digital-to-analog converter, and the analog domain downlink; the equalization filter in the cascaded filter circuit is configured to simulate a group delay unevenness characteristic of the duplexer in the multichannel PIM digital cancellation circuit; the linear filter of a cascaded filter fits an S parameter of the channel combiner in the multichannel PIM digital cancellation circuit, and precisely fits a combining process of the channel combiner in a digital domain, so that a signal capable of canceling a PIM interference signal of a multi-transmission and multi-reception inter-mediate radio frequency system that includes the channel combiner is finally generated in the multichannel PIM digital cancellation circuit.

Figure 4B:
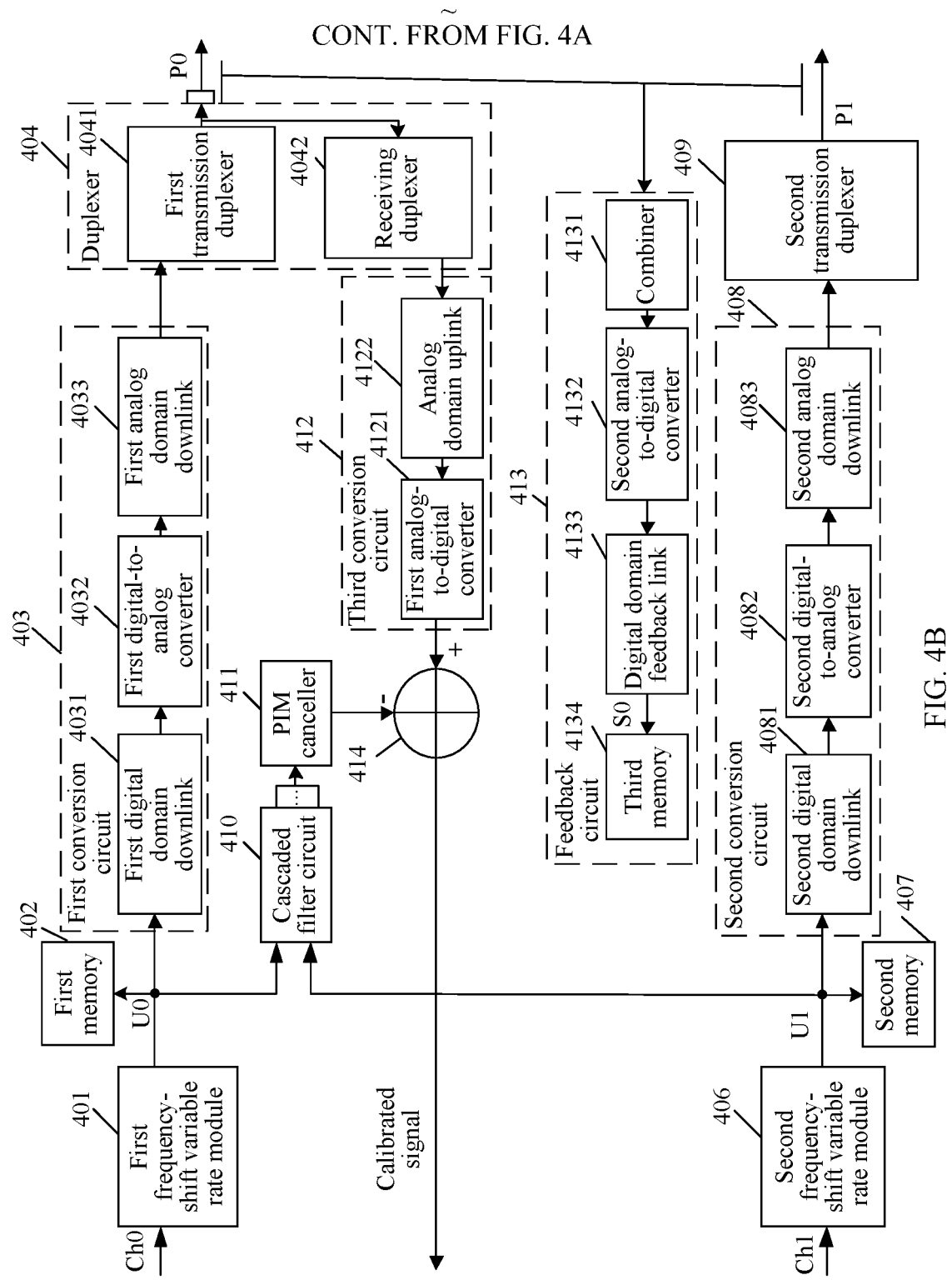

In a feasible embodiment, the channel combiner in the multichannel PIM digital cancellation circuit is a combiner in a V network structure, as shown in FIG. 4. FIG. 4 is a schematic structural diagram of a multichannel PIM digital cancellation circuit according to an embodiment of the present disclosure. As shown in FIG. 4, the circuit includes the following:

a first frequency-shift variable rate module 401, a first memory 402, a first conversion circuit 403, a duplexer 404, a channel combiner 405, a second frequency-shift variable rate module 406, a second memory 407, a second conversion circuit 408, a second transmission duplexer 409, a cascaded filter circuit 410, a PIM canceller 411, a third conversion circuit 412, a feedback circuit 413, and a first adder 414.

It should be noted that, besides the channel combiner 405 and the cascaded filter circuit 410 in the multichannel PIM digital cancellation circuit, for a connection relationship of other circuits or modules and related descriptions of functions, refer to the related description in the embodiment shown in FIG. 1. Details are not described herein again.

A first input/output port of the channel combiner 410 is connected to a first output port (that is, an output port of a first transmission duplexer 4041) and a second input port (that is, an input port of a receiving duplexer 4042) of the duplexer 404, and a second input/output port of the channel combiner 410 is connected to an output port of the second transmission duplexer 409. The channel combiner further includes N antennas, and the first input/output port and the second input/output port of the channel combiner are connected to the N antennas.

A signal output by the first transmission duplexer is transmitted out through the N antennas of the channel combiner, and a signal output by the second transmission duplexer is also transmitted out through the N antennas of the channel combiner.

A structure and a working principle of the cascaded filter circuit are described below.

Figure 5:
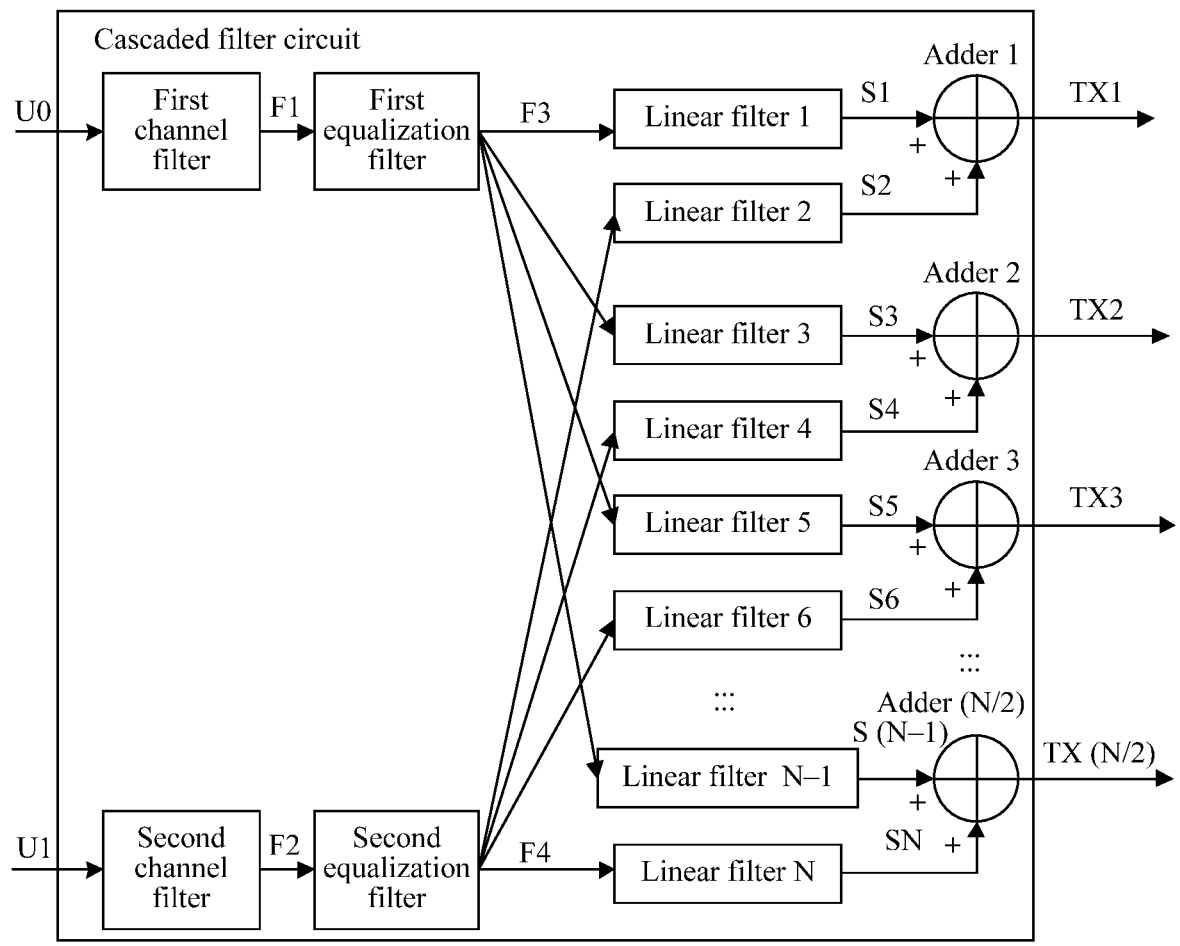
FIG. 5 is a schematic structural diagram of another cascaded filter circuit according to an embodiment of the present disclosure.

FIG. 5 is a schematic structural diagram of a cascaded filter circuit according to an embodiment of the present disclosure. As shown in FIG. 5, the cascaded filter circuit includes: a first channel filter, a second channel filter, a first equalization filter, a second equalization filter, N linear filters, and N/2 adders. The N linear filters in sequence are a linear filter 1, a linear filter 2, a linear filter 3, a linear filter 4, a linear filter 5, a linear filter 6, . . . , a linear filter N−1, and a linear filter N, and are respectively numbered as 1, 2, 3, 4, 5, 6, . . . , N−1, and N. The N/2 adders in sequence are an adder 1, an adder 2, an adder 3, . . . , and an adder N/2, and are respectively numbered as 1, 2, 3, . . . , and N/2. N is an even number greater than 2.

An input port of the first channel filter and an input port of the second channel filter are respectively a first input port and a second input port of the cascaded filter circuit. An output port of the first channel filter is connected to an input port of the first equalization filter, and an output port of the second channel filter is connected to an input port of the second equalization filter. An output port of the first equalization filter is connected to an input port of the linear filter that is numbered as an odd number in the N linear filters, and an output port of the second equalization filter is connected to an input port of the linear filter that is numbered as an even number in the N linear filters.

Output ports of each two linear filters (including an output port of a linear filter i and an output port of a linear filter j) in the N linear filters are connected to a first input port and a second input port of an adder m. A relationship between the number i of the linear filter i and the number j of the linear filter j is that: a difference between j and i is 1, j is an even number greater than 2 and less than or equal to N/2, and i is an odd number greater than 0 and less than N/2. The number m of the adder m is j/2. Output ports of the N/2 adders are the output ports of the cascaded filter circuit.

After the first processing signal U0 is input into the first channel filter, the first channel filter outputs a first filtering signal F1; and after the second processing signal U1 is input into the second channel filter, the second channel filter outputs a second filtering signal F2. $F1=FIR\_CH0 \otimes U0$, $F2=FIR\_CH1 \otimes U1$, and $FIR\_CH0$ and $FIR\_CH1$ are respectively a filtering coefficient of the first channel filter and a filtering coefficient of the second channel filter. After the first filtering signal F1 is input into the first equalization filter, the first equalization filter outputs a third filtering signal F3; and after the second filtering signal F2 is input into the second equalization filter, the second equalization filter outputs a fourth filtering signal F4. $F3=DUP\_EQ1 \otimes F1$, $F4=DUP\_EQ2 \otimes F2$, and $DUP\_EQ1$ and $DUP\_EQ2$ are respectively a filtering coefficient of the first equalization filter and a filtering coefficient of the second equalization filter.

After the third filtering signal F3 passes through the linear filters that are numbered as odd numbers in the N linear filters, the linear filters that are numbered as odd numbers in the N linear filters respectively output first linear filtering signals S1, S3, S5, . . . , and S(N−1). After the fourth filtering signal F4 passes through the linear filters that are numbered as even numbers in the N linear filters, the linear filters that are numbered as even numbers in the N linear filters respectively output first linear filtering signals S2, S4, S6, . . . , and SN. $S1=HB\_FIR1 \otimes F3$, $S3=HB\_FIR3 \otimes F3$, $S5=HB\_FIR5 \otimes F3$, . . . , and $S(N-1)=HB\_FIR(N-1) \otimes F3$; $S2=HB\_FIR2 \otimes F4$, $S4=HB\_FIR4 \otimes F4$, $S6=HB\_FIR6 \otimes F4$, . . . , and $SN=HB\_FIRN \otimes F4$, and HB_FIR1, HB_FIR3, HB_FIR5, . . . , and HB_FIR(N−1) are respectively linear filters that are numbered as odd numbers in the N linear filters, and HB_FIR2, HB_FIR4, HB_FIR6, . . . , and HB_FIRN are respectively linear filters that are numbered as odd numbers in the N linear filters.

After the first linear filtering signals S1, S2, S3, S4, S5, S6, . . . , S(N−1), and SN are input into the N/2 adders, N/2 second linear filtering signals TX1, TX2, TX3, . . . , and TX(N/2) are obtained. TX1=S1+S2, TX2=S3+S4, TX3=S5+S6, . . . , and TX(N/2)=S(N−1)+SN.

Figure 6:
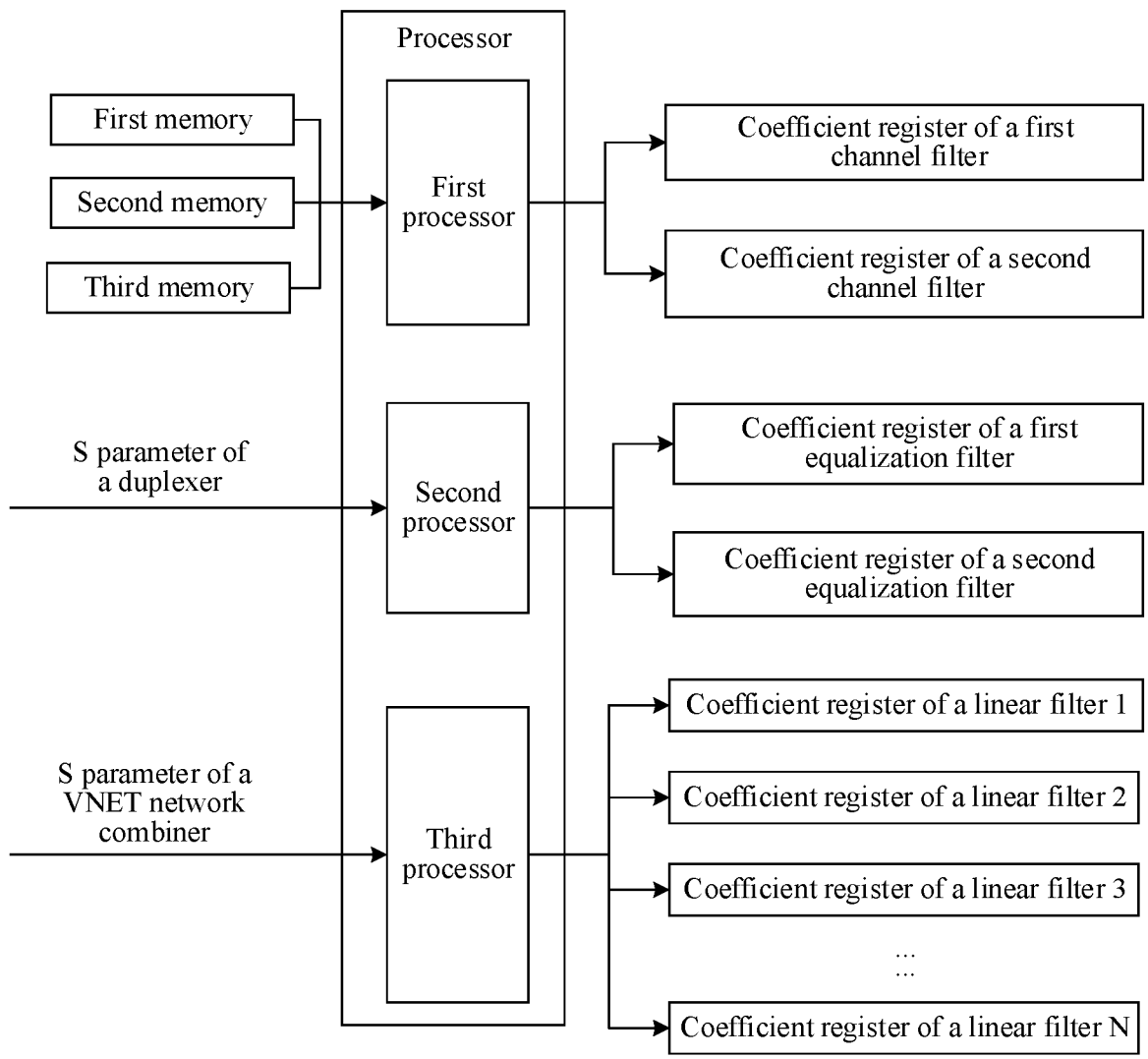
FIG. 6 is a partial schematic structural diagram of another multichannel PIM digital cancellation circuit according to an embodiment of the present disclosure.

As shown in FIG. 6, the multichannel PIM digital cancellation circuit further includes a processor, and the processor includes a first processor, a second processor, and a third processor.

An output port of the first memory, an output port of the second memory, and an output port of the third memory are all connected to an input port of the first processor, and an input port of a coefficient register of the first channel filter and an input port of a coefficient register of the second channel filter are connected to an output port of the first processor. An input port of a coefficient register of the first equalization filter and an input port of a coefficient register of the second equalization filter are connected to an output port of the second processor, and input ports of coefficient registers of the N linear filters are all connected to an output port of the third processor.

The first processor obtains the first sending signal from the first memory, obtains the fifth sending signal from the second memory, and obtains the third processing signal from the third memory. The first processor fits the first sending signal, the fifth sending signal, and the third processing signal by using LS linear interpolation, to obtain the filtering coefficient FIR_CH0 of the first channel filter and the filtering coefficient FIR_CH1 of the second channel filter. After the first processor obtains the FIR_CH0 and the FIR_CHL, the first processor downloads the FIR_CH0 and the FIR_CH1 respectively to the coefficient register of the first channel filter and the coefficient register of the second channel filter.

Before the first equalization filter and the second equalization filter in the cascaded filter circuit operate, the second processor performs a test on signal transmission and signal reception performed by the duplexer (including the first transmission duplexer and the receiving duplexer), to obtain two groups of group delay parameters or an S parameter of the duplexer. When the obtained data is the S parameter of the duplexer, the second processor converts the S parameter of the duplexer into the group delay parameter. The second processor fits the two groups of group delay parameters by using LS linear interpolation, to obtain the filtering coefficient DUP_EQ1 of the first equalization filter and the filtering coefficient DUP_EQ2 of the second equalization filter. After the second processor 1152 obtains the DUP_EQ1 and the DUP_EQ2, the second processor downloads the DUP_EQ1 and the DUP_EQ2 respectively to the coefficient register of the first equalization filter and the coefficient register of the second equalization filter.

Before the operation of the combiner in the V network structure, the third processor tests the channel combiner, to obtain the S parameter of the combiner in the V network structure. Then the third processor obtains frequency response information (herein refer to FIG. 4) of the signal from P0 to H0, from P0 to H1, from P0 to H2, . . . , from P0 to H(M−1), from P1 to H0, from P1 to H1, from P1 to H2, . . . , and from P1 to H(M−1) based on the S parameter, and M=N/2. The third processor fits the foregoing N paths of responses by linear interpolation respectively by using the N linear filters, to obtain the filtering coefficients of the N linear filters: HB_FIR1, HB_FIR2, HB_FIR3, . . . , and HB_FIRN. The third processor downloads the N filtering coefficients respectively to the coefficient registers of the N linear filters.

It should be noted that, the first channel filter and the second channel filter compensate for inconsistency of channel responses such as a delay difference or a phase difference generated when the first transmit signal Ch0 and the second transmit signal Ch1 pass through different channels, so that the first filtering signal and the second filtering signal that are input by the PIM canceller are respectively in consistency with characteristics of the fourth sending signal and the eighth sending signal that are input by the channel combiner. The first equalization filter and the second equalization filter are configured to simulate a group delay unevenness characteristic of the transmission duplexer. The foregoing N linear filters are configured to simulate a combining relationship and process of the combiner in the V network structure.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are example embodiments, and the related actions and modules are not necessarily mandatory to the present disclosure.

In the foregoing embodiments, the description of each embodiment has respective focuses. For a part that is not described in detail in an embodiment, refer to related descriptions in other embodiments.

In the several embodiments provided in this disclosure, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The embodiments of the present disclosure are described in detail above. The principle and implementation of the present disclosure are described herein through specific examples. The description about the embodiments of the present disclosure is merely provided to help understand the method and core ideas of the present disclosure. In addition, persons of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A multichannel passive intermodulation (PIM) digital cancellation circuit, comprising:
    a first frequency-shift variable rate module, a second frequency-shift variable rate module, a first conversion circuit, a second conversion circuit, a duplexer, a second transmission duplexer, a channel combiner, a third conversion circuit, a cascaded filter circuit, a PIM canceller, a feedback circuit, and a first adder, wherein:
    an input port of the first frequency-shift variable rate module is used as a first input port of the multichannel PIM digital cancellation circuit, an output port of the first frequency-shift variable rate module is connected to an input port of the first conversion circuit, an output port of the first conversion circuit is connected to a first input port of the duplexer, and a first output port of the duplexer is connected to a first input/output port of the channel combiner;
    an input port of the second frequency-shift variable rate module is used as a second input port of the multichannel PIM digital cancellation circuit, an output port of the second frequency-shift variable rate module is connected to an input port of the second conversion circuit, an output port of the second conversion circuit is connected to an input port of the second transmission duplexer, and an output port of the second transmission duplexer is connected to a second input/output port of the channel combiner;
    a first input port of the cascaded filter module is connected to the output port of the first frequency-shift variable rate module, a second input port of the cascaded filter module is connected to the output port of the second frequency-shift variable rate module, a first output port and the second output port of the cascaded filter module are connected to an input port of the PIM canceller, and an output port of the PIM canceller is connected to a first input port of the first adder; and the first input/output port of the channel combiner is connected to a second input port of the duplexer, a second output port of the duplexer is connected to an input port of the third conversion circuit, an output port of the third conversion circuit is connected to a second input port of the first adder, and an output port of the first adder comprises an output port of the multichannel PIM digital cancellation circuit.

2. The multichannel PIM digital cancellation circuit of claim 1, wherein the cascaded filter circuit comprises:

a first channel filter, a second channel filter, a first equalization filter, a second equalization filter, a first linear filter, a second linear filter, a third linear filter, a fourth linear filter, a second adder, and a third adder, wherein:

an input port of the first channel filter and an input port of the second channel filter are respectively a first input port and a second input port of the cascaded filter circuit, an output port of the first channel filter is connected to an input port of the first equalization filter, and an output port of the second channel filter is connected to an input port of the second equalization filter;

an output port of the first equalization filter is connected to an input port of the first linear filter and an input port of the second linear filter, and an output port of the second equalization filter is connected to an input port of the third linear filter and an input port of the fourth linear filter;

an output port of the first linear filter and an output port of the third linear filter are respectively connected to a first input port and a second input port of the second adder, and an output port of the second linear filter and an output port of the fourth linear filter are respectively connected to a first input port and a second input port the third adder; and an output port of the second adder and an output port of the third adder are respectively the first output port and the second output port of the cascaded filter circuit.

3. The multichannel PIM digital cancellation circuit of claim 1, wherein the first conversion circuit comprises:

a first digital domain downlink, a first digital-to-analog converter, and a first analog domain downlink, wherein:

an input port of the first digital domain downlink comprises the input port of the first conversion circuit, an output port of the first digital domain downlink is connected to an input port of the first digital-to-analog converter, an output port of the first digital-to-analog converter is connected to an input port of the first analog domain downlink, and an output port of the first analog domain downlink comprises the output port of the first conversion circuit.

4. The multichannel PIM digital cancellation circuit of claim 1, wherein the second conversion circuit comprises:

a second digital domain downlink, a second digital-to-analog converter, and a second analog domain downlink, wherein:

an input port of the second digital domain downlink comprises the input port of the second conversion circuit, an output port of the second digital domain downlink is connected to an input port of the second digital-to-analog converter, an output port of the second digital-to-analog converter is connected to an input port of the second analog domain downlink, and an output port of the second analog domain downlink comprises the output port of the second conversion circuit.

5. The multichannel PIM digital cancellation circuit of claim 1, wherein the duplexer comprises:

a first transmission duplexer and a receiving duplexer, wherein an input port of the first transmission duplexer comprises the first input port of the duplexer, an output port of the first transmission duplexer comprises the first output port of the duplexer; and an input port of the receiving duplexer comprises the second input port of the duplexer, and an output port of the receiving duplexer comprises the second output port of the duplexer.

6. The multichannel PIM digital cancellation circuit of claim 1, wherein the third conversion circuit comprises:

a first analog-to-digital conversion circuit and an analog domain uplink, wherein an input port of the analog domain uplink comprises the input port of the third conversion circuit, an output port of the analog domain uplink is connected to an input port of a first analog-to-digital converter, and an output port of the first analog-to-digital converter comprises the output port of the third conversion circuit.

7. The multichannel PIM digital cancellation circuit of claim 1, wherein the feedback circuit comprises:

a combiner, a second analog-to-digital converter, a digital domain feedback link, and a third memory, wherein:

an input port of the combiner comprises an input port of the feedback circuit, an output port of the combiner is connected to an input port of the second analog-to-digital converter; and an output port of the second analog-to-digital converter is connected to an input port of the digital domain feedback link, and an output port of the digital domain feedback link is connected to an input port of the third memory.

8. The multichannel PIM digital cancellation circuit of claim 6, wherein the multichannel PIM digital cancellation circuit further comprises a first data collection node U0, a second data collection node U1, and a third data collection node S0; and wherein the first data collection node U0 is located at the output port of the first frequency-shift variable rate module, the second data collection node U1 is located at the output port of the second frequency-shift variable rate module, and the third data collection node S0 is located at the output port of the second digital domain downlink.

9. The multichannel PIM digital cancellation circuit of claim 5, wherein the multichannel PIM digital cancellation circuit further comprises a first coupling node P0 and a second coupling node P1; and wherein the first coupling node P0 is connected to the output port of the first transmission duplexer, and the second coupling node P1 is connected to the output port of the second transmission duplexer.

10. The multichannel PIM digital cancellation circuit of claim 2, wherein the multichannel PIM digital cancellation circuit further comprises a first memory and a second memory; and wherein an input port of the first memory is connected to the output port of the first frequency-shift variable rate module, and an input port of the second memory is connected to the output port of the second frequency-shift variable rate module.

11. The multichannel PIM digital cancellation circuit of claim 10, wherein the multichannel PIM digital cancellation circuit further comprises a processor, the processor comprises a first processor, a second processor, and a third processor;
wherein an output port of the first processor, an output port of the second memory, and an output port of the third memory are all connected to an input port of the first processor, and an output port of the first processor is connected to an input port of a coefficient register of the first channel filter and an input port of a coefficient register of the second channel filter;
wherein an output port of the second processor is connected to an input port of a coefficient register of the first equalization filter and an input port of a coefficient register of the second equalization filter; and
wherein an output port of the third processor is connected to an input port of a coefficient register of the first linear filter, an input port of a coefficient register of the second linear filter, an input port of a coefficient register of the third linear filter, and an input port of a coefficient register of the fourth linear filter.

12. The multichannel PIM digital cancellation circuit of claim 11, wherein:
the first processor is configured to store data collected from the first data collection node U0 to the first memory;
the first processor is further configured to store data collected from the second data collection node U1 to the second memory; and
the first processor is further configured to store data collected from the third data collection node S0 to the third memory.

13. The multichannel PIM digital cancellation circuit of claim 12, wherein the first processor is further configured to:
obtain the data collected from the first data collection node U0 from the first memory, obtain the data collected from the second data collection node U1 from the second memory, and obtain the data collected from the third data collection node S0 from the third memory;
fit the data collected from the first data collection node U0, the data collected from the second data collection node U1, and the data collected from the third data collection node S0 using linear interpolation, to obtain a filtering coefficient of the first channel filter and a filtering coefficient of the second channel filter; and
download the filtering coefficient of the first channel filter and the filtering coefficient of the second channel filter respectively to the coefficient register of the first channel filter and the coefficient register of the second channel filter.

14. The multichannel PIM digital cancellation circuit of claim 12, wherein the second processor is further configured to:
obtain an S parameter of the duplexer;
fit the S parameter of the duplexer using linear interpolation, to obtain a filtering coefficient of the first equalization filter and a filtering coefficient of the second equalization filter; and
download the filtering coefficient of the first equalization filter and the filtering coefficient of the second equalization filter respectively to the coefficient register of the first equalization filter and the coefficient register of the second equalization filter.

15. The multichannel PIM digital cancellation circuit of claim 12, wherein the third processor is further configured to:
obtain an S parameter of the channel combiner;
fit the S parameter of the channel combiner using linear interpolation, to obtain a filtering coefficient of the first linear filter, a filtering coefficient of the second linear filter, a filtering coefficient of the third linear filter, and a filtering coefficient of the fourth linear filter; and
download the filtering coefficient of the first linear filter, the filtering coefficient of the second linear filter, the filtering coefficient of the third linear filter, and the filtering coefficient of the fourth linear filter respectively to the coefficient register of the first linear filter, the coefficient register of the second linear filter, the coefficient register of the third linear filter, and the coefficient register of the fourth linear filter.

* * * * *